US008814133B2

(12) United States Patent
Li et al.

(10) Patent No.: US 8,814,133 B2
(45) Date of Patent: Aug. 26, 2014

(54) AUTOMATIC SPEED SEARCHING DEVICE AND METHOD FOR A PARTIAL STROKE TEST OF A CONTROL VALVE

(75) Inventors: Jingli Li, Louisville, KY (US); Bruce Rigsby, Charlestown, IN (US); Robert L. LaFountain, Charlestown, IN (US); Bruce R. Penning, Louisville, KY (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 192 days.

(21) Appl. No.: 13/167,449

(22) Filed: Jun. 23, 2011

(65) Prior Publication Data

US 2012/0325322 A1 Dec. 27, 2012

(51) Int. Cl.
*F16K 31/02* (2006.01)

(52) U.S. Cl.
USPC .................... 251/129.04; 251/29; 251/30.01; 73/168

(58) Field of Classification Search
USPC ................. 251/28, 29, 30.01, 129.04; 73/168
See application file for complete search history.

(56) References Cited

U.S. PATENT DOCUMENTS 4,181,017 A 1/1980 Markle
4,215,844 A * 8/1980 Bowen ........................... 251/28
6,685,159 B1 * 2/2004 Schnell .......................... 251/59
6,739,293 B2 * 5/2004 Turner et al. ............... 123/90.12
7,086,358 B2 * 8/2006 Panciroli .................... 123/90.12
8,290,631 B2 10/2012 Sweeney et al.
8,413,677 B1 * 4/2013 Coffman et al. .............. 137/488
2006/0191314 A1 * 8/2006 Karte ............................ 73/1.72
2008/0004836 A1 * 1/2008 Tewes et al. .................. 702/182
2009/0309052 A1 12/2009 Kresse et al.
2010/0065258 A1 * 3/2010 Blomquist ............... 165/104.34
2010/0181513 A1 7/2010 Kresse
2010/0229975 A1 * 9/2010 Sweeney et al. .............. 137/556

OTHER PUBLICATIONS

International Search Report PCT/US2012/040879 dated Oct. 12, 2012.
Written Opinion PCT/US2012/040879 dated Oct. 12, 2012.
Office Action for U.S. Appl. No. 13/173,550, dated Mar. 12, 2014.

* cited by examiner

*Primary Examiner* — Eric Keasel
*Assistant Examiner* — Ian Paquette
(74) *Attorney, Agent, or Firm* — Marshall, Gerstein & Borun LLP

(57) ABSTRACT

An automatic speed searching device for a partial stroke test of a control valve includes a spool valve operatively connected to a pilot valve and a blocker valve. An electrical module is operatively connected to the pilot valve, a supply of control fluid, and the blocker valve. In an open position of the spool valve, a first control fluid inlet is fluidly connected to a first control fluid outlet, and in a closed position of the spool valve the first control fluid outlet is fluidly connected to a second control fluid outlet. A method of determining an optimum stroke speed includes iteratively powering a main and secondary solenoid in the electrical module and updating parameters to move a control element of the control valve until movement of the control element is within a desired range.

20 Claims, 7 Drawing Sheets

AUTOMATIC SPEED SEARCHING DEVICE AND METHOD FOR A PARTIAL STROKE TEST OF A CONTROL VALVE

TECHNICAL FIELD

The present invention relates generally to control valve or actuator stem speed searching devices and more specifically relates to an automatic control valve or actuator stem optimal speed searching device for a partial stroke test of a control valve.

BACKGROUND

Existing process control systems often employ control valves to control fluid flow though the process control system. Because control valves occasionally fail, it is desirable to perform periodic diagnostics on process control devices or process control components, such as the control valves, to determine the operability and performance of such devices. Determining the operability of a process control device may permit better scheduling of maintenance of the process control device, thereby decreasing failure occurrences and down time. This may result in increased efficiency, safety, and revenue. The process control systems may use various sensors and other measurement devices to observe characteristics of a process control device. For example, some existing control systems may use a digital valve controller to measure and collect data from various sensors on a control valve.

One diagnostic used to evaluate control valves is a valve signature test that measures the position of an actuator or actuator valve opening against an input to the valve, such as an actuator pressure or control signal. A graphical presentation of a signature graph may make it easier for plant operators to notice or detect changes in the characteristics of a valve that may indicate degradation in equipment, and thus, some control systems may implement valve maintenance software, such as AMS™ ValveLink® software from Fisher Controls International LLC of St. Louis, Mo., to display signature graphs. Some valve characteristics that may be determined from a valve signature test may include, but are not limited to, valve friction, actuator torque, dead band and shutoff capability, and actuator spring rate and bench set.

For example, a valve signature test may be run when a control valve is new in order to benchmark the control valve's performance (e.g., valve manufacturer testing). One skilled in the art may understand that the valve signature test may record and/or trend the travel distance or position of the moveable element, such as a valve plug, in the control valve when opening and closing with respect to the applied actuating pressure for initiating such movement. As subsequent valve signature tests are performed on the control valve over time, the results of the signature tests may be reviewed with respect to previous tests to determine various characteristic changes, such as changes in actuator spring rate and valve friction or torque, to determine whether any degradation in performance or control of the control valve has occurred.

Some process control systems may have valve positioning devices (e.g., positioners) that both measure the actual position of a valve member and compare the actual position against a desired position. If the actual position and desired position differ from one another, the positioner adjusts the actual position to match the desired position. Because the positioner both measures the signal inputs into the valve actuator and the position of the valve member, software within the positioner (or in a computer operatively connected to the positioner) may compare the actual measurements to desired or baseline measurements to determine whether valve performance is degrading. However, less sophisticated process control systems may utilize control valves without positioners. Currently no simple, cost effective, devices exist that are capable of monitoring the performance of control valves without positioners.

SUMMARY

An automatic speed searching device for a partial stroke test of a control valve includes a spool valve operatively connected to a pilot valve, the pilot valve being configured to position the spool valve to one of an open position and a closed position. The spool valve includes a first control fluid inlet, a first control fluid outlet, and a second control fluid outlet, the first control fluid inlet being fluidly connected to a supply of control fluid and the first control fluid outlet being configured to be connected to a valve actuator. A blocker valve is fluidly connected to the second control fluid outlet of the spool valve. An electrical module is operatively connected to the pilot valve, the supply of control fluid, and the blocker valve. In an open position of the spool valve, the first control fluid inlet is fluidly connected to the first control fluid outlet, and in a closed position of the spool valve the first control fluid outlet is fluidly connected to the second control fluid outlet.

A method of automatically determining an optimal stroke speed for a partial stroke test when moving a control element from an open position to a closed position, or vice versa, includes providing an optimal speed searching device having a spool valve operatively connected to a pilot valve and a blocker valve. An electrical module is operatively connected to the pilot valve, a supply of control fluid, and the blocker valve, the electrical module including a main solenoid communicatively connected to the pilot valve and a secondary solenoid communicatively connected to the blocker valve.

When determining a partial stroke optimal stroke speed for control valve movement from an open position to a closed position, a pulse time ($t_0$) is initially determined by measuring how long the valve takes from a full open position to a full closed position at full or maximum speed. A desired time (T) is chosen for the valve to move from the full open to the full closed position at a reduced or controlled speed. T is somewhat greater than $t_0$. A total number of opening (or closing) steps (N) is also chosen. An initial length of each step (e.g., a stroke speed factor (X)) is set by the formula $X=t_0/N$, and boundary conditions for X are initially set by the formulas $X_{min}=0$, and $X_{max}=B=T/N$. After N/2 steps are complete, a position of the control element is measured. Adjustments are made and the test is repeated until the control element moves between one half and one quarter of the full stroke length.

More specifically, main and secondary solenoids are powered on or off iteratively to control movement of the control element during the test. When performing the partial stroke test starting from an open position, the main solenoid is initially powered off. The secondary solenoid is powered off for X seconds and thereafter, the secondary solenoid is powered on for Y seconds, where $Y=B-X$. The secondary solenoid is iteratively powered off and on for X and Y seconds, respectively, and the control element position is measured. Thereafter, X, $X_{max}$, and $X_{min}$ are adjusted and the test is iteratively repeated until movement of the control element is between one quarter of the full stroke length and one half of the full stroke length.

When determining a partial stroke optimal stroke speed for control valve movement from a closed position to an open position, the secondary solenoid is initially powered on and the main solenoid is powered on for X seconds and powered off for Y seconds. A position of the control element is measured and the test is repeated until the control element moves between one quarter and one half of the full stroke length.

DETAILED DESCRIPTION OF THE PREFERRED EMBODIMENTS

Although the following text sets forth a detailed description of exemplary embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the art may be able to implement one or more alternative embodiments, using either current technology or technology developed after the filing date of this patent. Such additional indictments would still fall within the scope of the claims defining the invention.

Control devices used in process control systems may include process control devices, such as a control valves, dampers or other alterable opening means, to modulate or control fluid flow within the process control system. Although the example embodiments described herein are based upon pneumatically-actuated control valves, other process control devices such as pumps, electrically-actuated valves, dampers and the like may also be contemplated without departing from the spirit and scope of the present invention. In general, control devices, such as control valve assemblies, may be positioned in conduits or pipes to control fluid flow by altering the position of a moveable element, such as a valve plug within the control valve, using an attached actuator. Adjustments to the control element may be used to influence some process condition to maintain a selected flow rate, a pressure, a fluid level, or a temperature.

The control valve assembly is typically operated from a regulated source of pneumatic fluid pressure, such as air from a plant compressor, although other control fluids may be used. This fluid pressure is introduced into the actuator (such as a spring and diaphragm actuator for sliding stem valves or a piston actuator for rotary valves) through a valve control instrument which controls the fluid pressure in response to a signal received from the process control system. The magnitude of the fluid pressure in the actuator determines the movement and position of the spring and diaphragm or piston within the actuator, thereby controlling the position of a valve stem coupled to the control element of the control valve. For example, in the spring and diaphragm actuator, the diaphragm must work against a bias spring, to position the control element (i.e., valve plug) within a valve passageway between the inlet and the outlet of the control valve to modify flow within the process control system. The actuator may be designed so that increasing fluid pressure in the pressure chamber either increases the extent of the control element opening or decreases it (e.g., direct acting or reverse acting).

Figure 1:
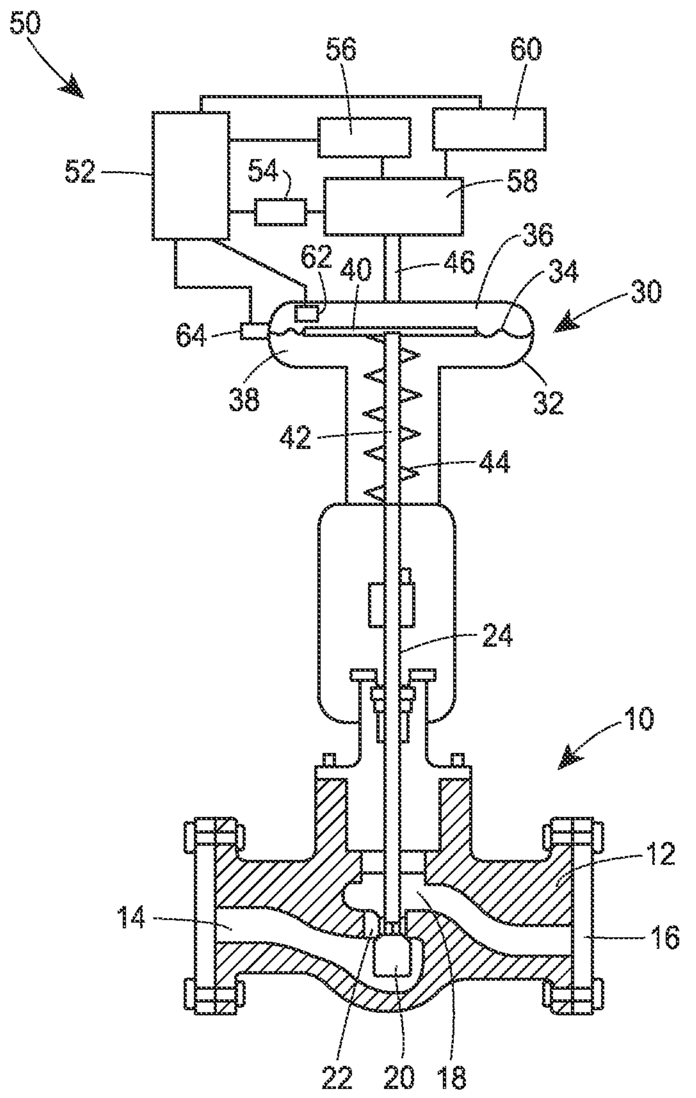
FIG. 1 is a cross-sectional view of control valve including an automatic speed searching device for a partial stroke test.
Figure 2:
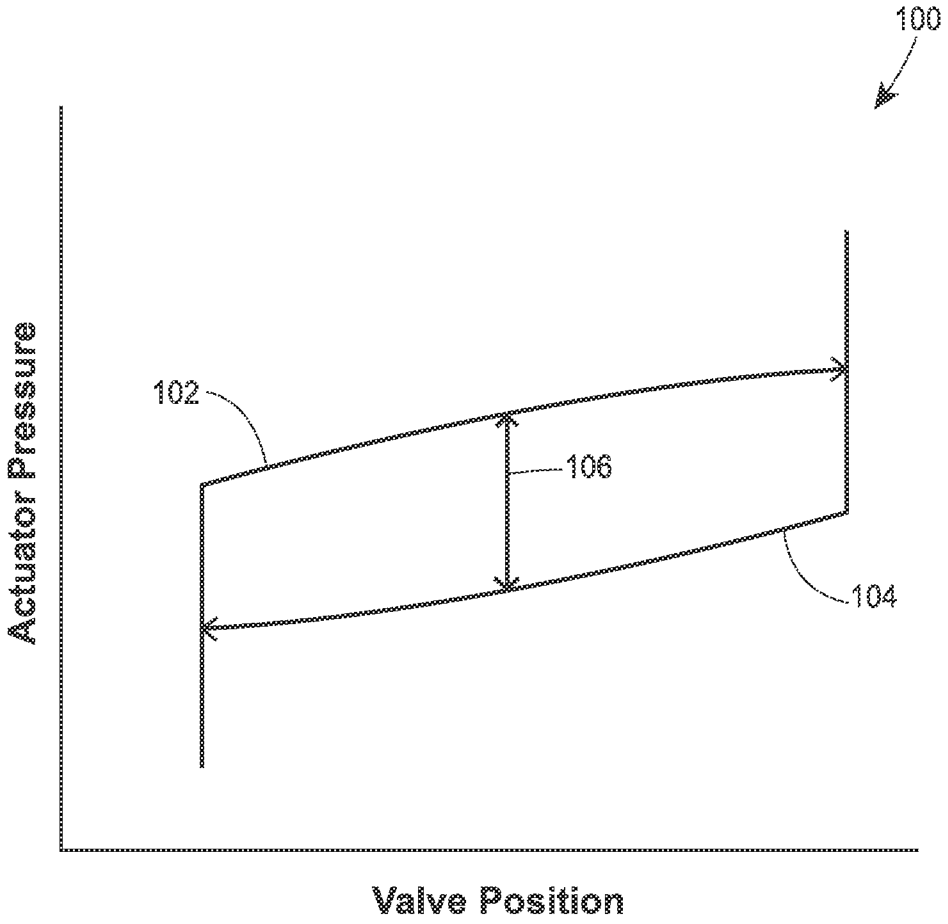
FIG. 2 is an example of a valve signature graph.

The control valve 10 of the system illustrated in FIG. 1, includes relationships involving characteristic loops between an output variable, such as a valve position, and an input variable, such as a setpoint or command signal. This relationship may be referred to as a signature graph, an example of which is illustrated in FIG. 2, where, for example, an actuator pressure is plotted against the position of the control element as represented by valve stem or actuator stem position. As illustrated in FIG. 2, a full range input-output characteristic for fluid pressure in the actuator may be plotted over a corresponding range of the output position of the moveable element of the control valve 10. Alternative input variables, such as setpoint command signals, may also be used in signature graphs.

Returning to FIG. 1, the control valve 10 includes a valve body 12 having a fluid inlet 14 and a fluid outlet 16, connected by a fluid passageway 18. A control element or valve plug 20 cooperates with a valve seat 22 to vary fluid flow through the control valve 10. The valve plug 20 is connected to a valve stem 24 which moves the valve plug 20 relative to the valve seat 22. An actuator 30 provides force to move the valve plug 20. The actuator 30 includes an actuator housing 32 that encloses a diaphragm 34. The diaphragm 34 separates the actuator housing 32 into a first chamber 36 and a second chamber 38, which are fluidly separated from one another by the diaphragm 34. The diaphragm 34 is mounted to a diaphragm plate 40 that is attached to an actuator stem 42. The actuator stem 42 is connected to the valve stem 24. A spring 44 is disposed in the second chamber 38 and biases the diaphragm plate 40 towards from the valve seat 22 in this embodiment. In other embodiments, the spring 44 may be located in the first chamber 36, or the spring 42 may bias the diaphragm plate away from the valve seat 22. Regardless, by varying the pressure in one of the first and second chambers 36, 38, the actuator stem 42 moves, which positions the valve plug 20 relative to the valve seat 22 to control fluid flow through the valve 10. In the embodiment of FIG. 1, the actuator housing 32 includes a control fluid inlet port 46 for providing control fluid to the first chamber 36, or for removing control fluid from the first chamber 36 to vary the control fluid pressure in the first chamber 36.

An automatic speed searching device 50 is connected to the control fluid inlet port 46 of the actuator 30. The automatic speed searching device 50 controls the flow of control fluid into, and out of, the actuator 30 to search for an optimum stroke speed for a partial stroke test. The automatic speed searching device 50 includes an electrical module 52, a pilot valve 54, a source of control fluid, such as a pneumatic supply tank 56, a spool valve 58, and a blocker valve 60. The electrical module 52 receives pressure and position inputs from a pressure sensor 62 and a position sensor 64 that are attached to, or located within, the actuator housing 32. The pressure sensor 62 measures control fluid pressure within the first chamber 36 in this embodiment. In other embodiments, the pressure sensor 62 may measure control fluid pressure, or other fluid pressure, within the second chamber 38. The position sensor 64 measures a position of the diaphragm 34, diaphragm plate 40, actuator stem 44, and/or valve stem 24. Although the position sensor 64 may measure a position of more than one of the diaphragm 34, diaphragm plate 40, actuator stem 44 and valve stem 24, the position of only one of these elements is needed by the electrical module 52.

Signals from the pressure sensor 62 and the position sensor 64 are transmitted to the electrical module 52, where the signals are interpreted and the electrical module 52 sends further signals to one or more of the pilot valve 54, supply tank 56, and valve blocker 60 to actuate the valve stem 24 during the partial stroke test. Signals from the pressure sensor 62 and position sensor 64 may be sent to the electrical module 52 via a wired connection, a wireless connection, or any other electrical connection. Alternatively, the pressure sensor 62 and position sensor 64 may send pneumatic, hydraulic, or mechanical signals to the electrical module. The electrical module 52, in turn, sends control signals to the pilot valve 54, supply tank 56, and blocker valve 60. The control signals may be electrical signals sent via wired or wireless connections. Alternatively, the control signals may be pneumatic, hydraulic, or mechanical signals.

FIG. 2 illustrates a full-stroke signature graph 100 where a control valve is fully opened from a fully closed position (upstream portion) 102 and where the control valve is fully closed from a fully open position (downstream portion) 104. The characteristic graph illustrates that an initial pressure buildup is required to overcome momentum and friction or torque of the actuator 30 and/or control valve 10 before the control valve 10 begins to open and permit flow. When transitioning from an opening movement to a closing movement, momentum and friction may need to be overcome to force the control valve 10 in the other direction. The pressure required for the transition movement may be illustrated by a vertical path 106 crossing between the upstream and downstream paths 102, 104. The area between the upstream and downstream paths 102, 104 may be referred to as the deadband.

As the control valve or valve performance degrades over time (e.g., control element wear, valve packing wear, leaks in the actuator pressure chamber, etc.), the signature graph may change from an initial benchmark measurement graph. This change in the signature graph over time may be indicative of degradation in operation of the valve, due to, for example, friction. The change may prompt repair or replacement of the valve or components of the valve.

A baseline signature graph may be obtained from a manufacturer test. Alternatively, the baseline signature graph may be derived from user measurements either before installation or during some initial operation time. This baseline graph may be used to assist the user in configuring the boundary. For example, using the displayed baseline signature graph, a user may set or configure one or more boundaries that may serve as deviation thresholds from the baseline against which new signature graph measurements may be compared with. The boundaries may be updated as the user configures them using the baseline signature graphs. Alternatively, the boundaries may be drawn using a typical computer input device such as a mouse or light pen. One example of an evaluation system for valve signature graphs is disclosed in U.S. Patent Publication No. 2008/0004836, assigned to Fisher Controls International. U.S. Patent Publication No. 2008/0004836 is hereby incorporated by reference herein.

The boundaries that are configured by the user using a baseline signature graph may be used to determine whether an updated, current, or new signature graph conforms to the tolerances represented by the preset boundaries or whether the signature graph indicates a degradation or deviation in one or more characteristics that require some maintenance action, such as repair or replacement of the control valve. For example, after configuring one or more boundaries, a current signature graph may be measured and analyzed against the configured boundaries to determine whether any graph points violate or exceed the boundaries. A current signature graph may be displayed and superimposed on the pre-configured boundaries to determine characteristic failures, for example, whether the current signature graph has points outside of a preset boundary.

The general operation of a control valve, however, may not always force a full cycle around the entire characteristic valve signature curve during normal online operation of the control valve in connection with a process control system for controlling at least part of the process. Such full magnitude range traversal, or full stroke graph, over the input-output characteristic of the control valve may, in many processes, only occur during special testing of the control valve (e.g., during manufacturer testing or plant shutdown). Instead, only a partial stroke measurement may be possible. In this situation, the range of the one or more boundaries may simply be configured or adjusted to match the partial stroke range. Also, the graph may still be based on a full-stroke factory test, however, only a portion of that graph may be used to determine current valve characteristic boundaries. Alternatively, multiple partial stroke graphs may be used to form a baseline graph for purposes of setting boundary conditions for both current partial stroke graphs or current full stroke graphs.

Figure 3:
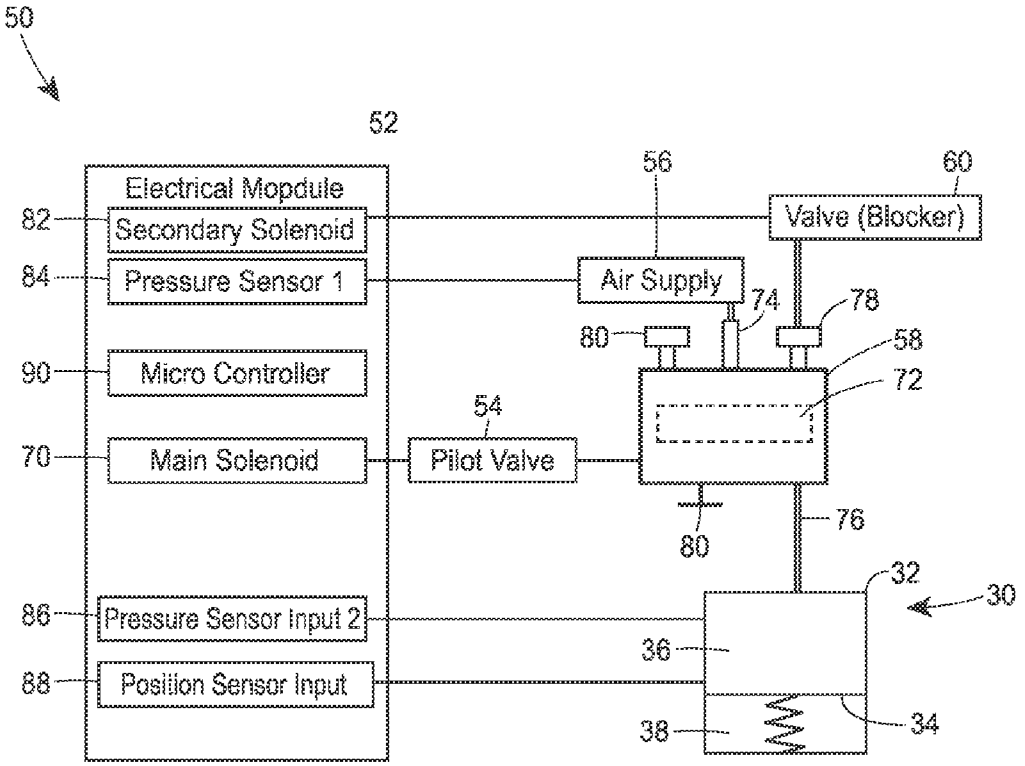
FIG. 3 is a schematic illustration of the automatic speed searching device of FIG. 1.

FIG. 3 illustrates the automatic speed searching device 50 in more detail. The electrical module 52 includes a main solenoid 70 communicatively connected to the pilot valve 54. The main solenoid 70 controls a configuration of the spool valve 58 by sending command signals to the pilot valve 54, which, in turn, positions the spool valve 58. In one embodiment, the command signal sent from the main solenoid 70 is an electrical signal and a signal sent from the pilot valve 54 to the spool valve 58 is a pneumatic or hydraulic signal. In other embodiments, the signal from the pilot valve 54 may also be an electrical signal. The spool valve 58 includes a slidable piston 72 that moves in response to the signal from the pilot valve 54. The spool valve 58 also includes a control fluid inlet port 74, a first control fluid outlet port 76, and a second control fluid outlet port 78. The spool valve 58 may also include one or more plugs 80.

The electrical module 52 may also include a secondary solenoid 82 that is communicatively connected to the blocker valve 60. The secondary solenoid 82 sends electrical signals to the blocker valve 60 to open or close the blocker valve 60. A first pressure sensor 84 measures pressure in the supply tank 56, while a second pressure sensor input 86 receives a pressure signal from the pressure sensor 62 (FIG. 1) that indicates fluid pressure in the actuator 30. A position sensor input 88 receives a position sensor signal from the position sensor 64 (FIG. 1) that indicates a position of the actuator stem 42 and/or valve stem 24. A processor 90 processes the pressure and position inputs according to the logic illustrated in FIGS. 6 and 7 and controls the main and secondary solenoids 70, 82 to selectively position the pilot valve 54, spool valve 58, and the blocker valve 60.

Figure 4:
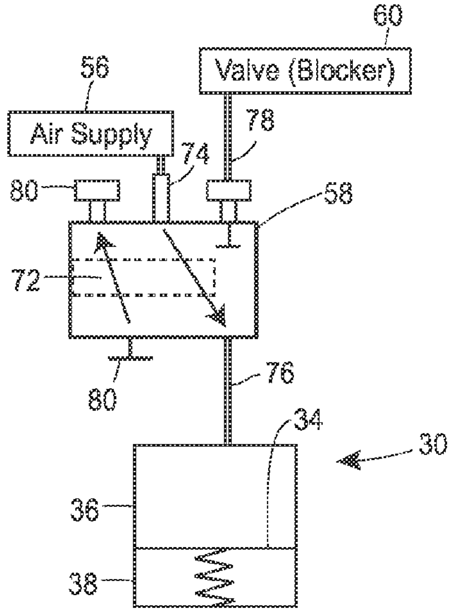
FIG. 4 is a schematic illustration of the automatic speed searching device of FIG. 3 with a spool valve in an open position.

As illustrated in FIG. 4, the electrical module 52 configures the spool valve 58 to port control fluid into the actuator 30 from the supply tank 56 by instructing the pilot valve 54 to position the piston 72 to fluidly connect the control fluid inlet port 74 with the first control fluid outlet port 76. As control fluid flows from the supply tank 56, through the spool valve 58, and into the actuator 30, control fluid pressure will increase in the first chamber 36 of the actuator, causing the diaphragm 34, and the diaphragm plate 40, to move towards the control valve 10 (FIG. 1). As a result, the actuator stem 42 and the valve stem 24 will also move towards the control valve 10, causing the valve plug 20 to move away from the valve seat 22, which results in more fluid flow through the control valve.

Figure 5:
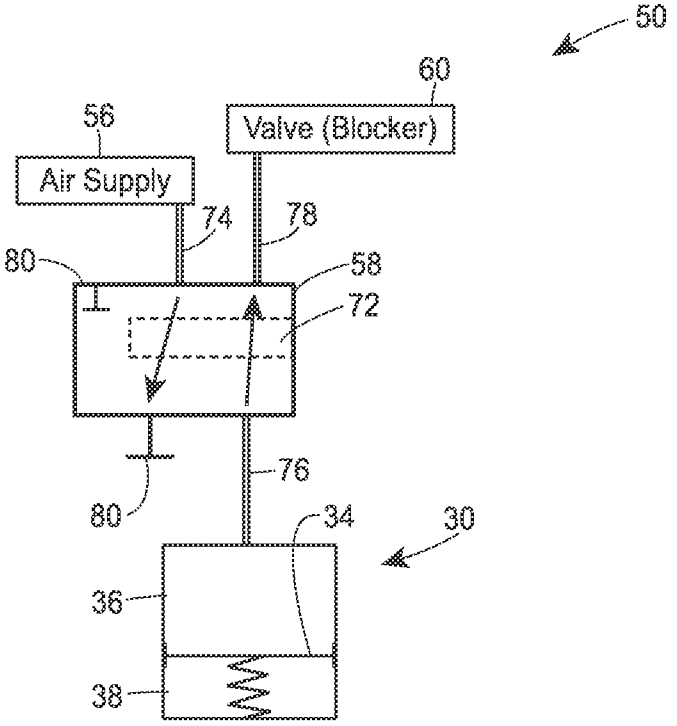
FIG. 5 is a schematic illustration of the automatic speed searching device of FIG. 3 with the spool valve in a closed position.

As illustrated in FIG. 5, the electrical module 52 may also configure the spool valve 58 to port control fluid out of the actuator 30 by instructing the pilot valve 54 to position the piston 72 to fluidly connect the second control fluid outlet port 78 and the first control fluid outlet port 76 (which in this case ports fluid out of the actuator 30 and into the spool valve 58). As control fluid flows from the actuator 30, through the spool valve 58, and into the blocker valve 60, control fluid pressure will decrease in the first chamber 36 of the actuator, causing the diaphragm 34, and the diaphragm plate 40, to move away from the control valve 10 (FIG. 1). As a result, the actuator stem 42 and the valve stem 24 will also move away from the control valve 10, causing the valve plug 20 to move away from the valve seat 22, which results in more fluid flow through the control valve. In this configuration, control fluid from the supply tank 56 is fluidly connected to one plug 80, which prevents control fluid from flowing into the actuator 30. Also, in this configuration, the blocker valve 60 ultimately controls the rate of fluid flow out of the actuator 30.

The processor 90 sends signals in the form of electrical pulses to the main and secondary solenoids 70, 82 to operate the main and secondary solenoids 70, 82 in a step-wise manner. In this way, the processor 90 can precisely and incrementally cause control fluid to flow into or out of the actuator 30 by controlling positions of the piston 72 and the blocker valve 60. As a result, the actuator stem 42 and the valve stem 24 also move incrementally.

When performing a partial stroke test, the automatic speed searching system 50 determines an optimum stroke speed for the partial stroke test regardless of actuator type, actuator size, or control fluid pressure by executing a set of software instructions on the processor 90. As a result, the disclosed automatic speed searching system 50 is universal (e.g., can be used with a virtually infinite combination of actuator types, actuator sizes, and control fluid pressures). Moreover, the disclosed automatic speed searching system 50 may be retrofitted on existing control valves.

Generally speaking, once a full speed time to move the valve from fully open to fully closed, or vice versa, is determined, the automatic speed searching system 50 determines an optimum pulse width for the partial stroke test (e.g., at reduced speeds and/or partial stroke lengths) through iteration. Once the optimum stroke speed is determined, the automatic speed searching system conducts the partial stroke test without the need for a limit switch, which was required in prior art positioners. Moreover, the disclosed automatic speed searching system 50 may be used as a simple positioner in control valves that do not have positioners. Compared to known positioners, the disclosed automatic speed searching system 50 is simpler in construction and more durable than known positioners.

Figure 6:
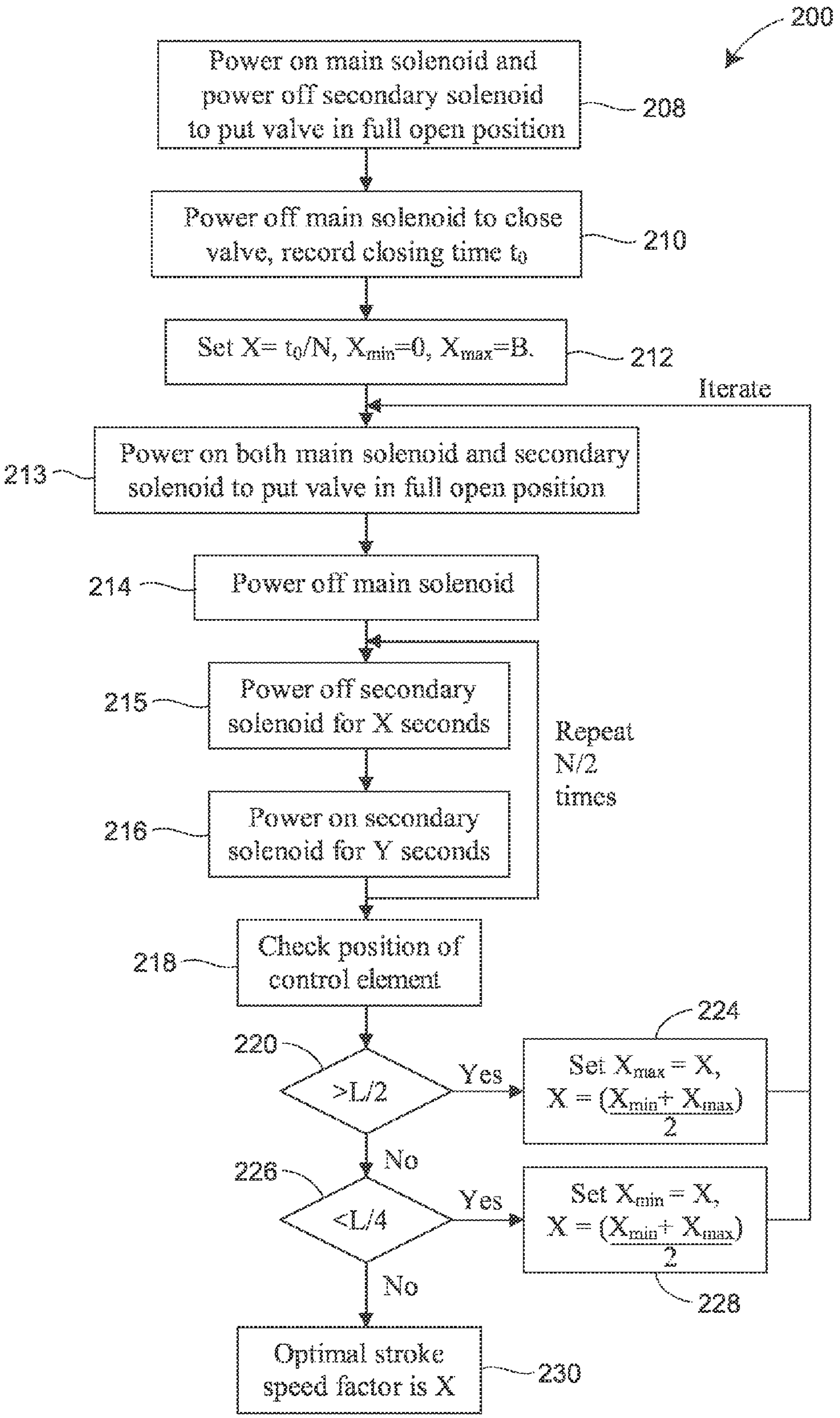
FIG. 6 is a logic diagram illustrating logic steps employed by a controller of the automatic speed searching device of FIG. 3 when performing a partial stroke test moving a control element from an open position to a closed position.

The disclosed automatic speed searching system 50 iteratively searches for an optimum pulse width for a partial stroke test by executing a software program on the processor 90. The software program may use a set of logic instructions, such as the logic illustrated in FIGS. 6 and 7. The logic diagram of FIG. 6 is an example of logic that may be used to execute a speed searching routine for a partial stroke test when the valve plug or control element moves from an open position towards a closed position. Similarly, the logic diagram of FIG. 7 is an example of logic that may be used to execute a speed searching routine for a partial stroke test when the valve plug or control element moves from a closed position towards an open position.

Turning now to FIG. 6, an example of partial stroke test logic 200 is illustrated for open towards closed movement of the control element. Initially, certain parameters are set for the system. For example, a full stroke length (L), a target time for full movement (T), and a number of steps (N) are input. These initial values may be selected by a user in the case of the target time (T) and number of steps (N), or the initial values may be based on manufacturer's data, or actual measurements, for example in the case of full stroke length (L). Each stroke step (B) takes T/N seconds. The processor 90 begins with the initial inputs discussed above. At step 208, the main solenoid 70 is powered on and the secondary solenoid 82 is powered off to position the control element or valve plug 20 in a full open position. The main solenoid 70 is powered off at step 210 and a time ($t_0$) is measured, where $t_0$ is defined as the time to stroke the control element or valve plug 20 from a full open to a full closed position at full or maximum speed. As discussed above, $t_0$ may be determined from manufacturer's data or an initial measurement that is performed after valve installation, $t_0$ does not need to be measured for every test. Once $t_0$ is measured (or input from manufacturers data), $t_0$ remains constant unless on operator determines that $t_0$ should be re-measured. At step 212, the processor 90 sets the stroke speed factor (X) to equal $t_0$/N, where the stroke speed has minimum ($X_{min}$=0) and maximum ($X_{max}$=B) values. At step 213, the main and secondary solenoids 70, 82 are powered on to move the control element or valve plug 20 to a full open position in preparation for performing the partial stroke test. At step 214, the processor 90 instructs the main solenoid 70 to power off so that the fluid supply 56 is cut off from the actuator 50. At step 215, the processor 90 instructs the secondary solenoid 82 to power off for X seconds and at step 216, the processor 90 instructs the secondary solenoid 82 to power on for Y=B−X seconds. In this way, control fluid is released from the actuator 50 in a step-wise manner through the blocker valve 60. Thus, the control element or valve plug 20 also moves in a step-wise manner. Steps 215 and 216 are performed iteratively N/2 times before proceeding to step 218. In other embodiments, steps 215 and 216 may be performed more or less than N/2 times. After performing steps 215 and 216 N/2 times, the position of the control member 20 is determined by the position signal from the position sensor 88 at step 218, and the position sensor 88 provides the position signal to the controller 90. A decision is made as step 220, where if the control element 20 has moved more than L/2, then the controller 90 sets $X_{max}$=X and X=($X_{min}$+$X_{max}$)/2 at step 224. Thereafter, steps 215 and 216 are again iteratively performed N/2 times before moving to step 218. If, however, at step 220, the control element 20 has not moved more than L/2, the processor 90 proceeds to step 226. At step 226, if the control element 20 has moved less than L/4, the processor 90 sets $X_{min}$=X and X=($X_{min}$+$X_{max}$)/2 at step 228. Thereafter, steps 215 and 216 are again iteratively performed N/2 times before moving to step 218. If, however, at step 226, the actuator stem has moved more than L/4, then by definition, the actuator movement is in the range of L/2 to L/4. This range is considered sufficient to define an optimal pulse speed or stroke speed factor, which is defined as X at step 230.

Figure 7:
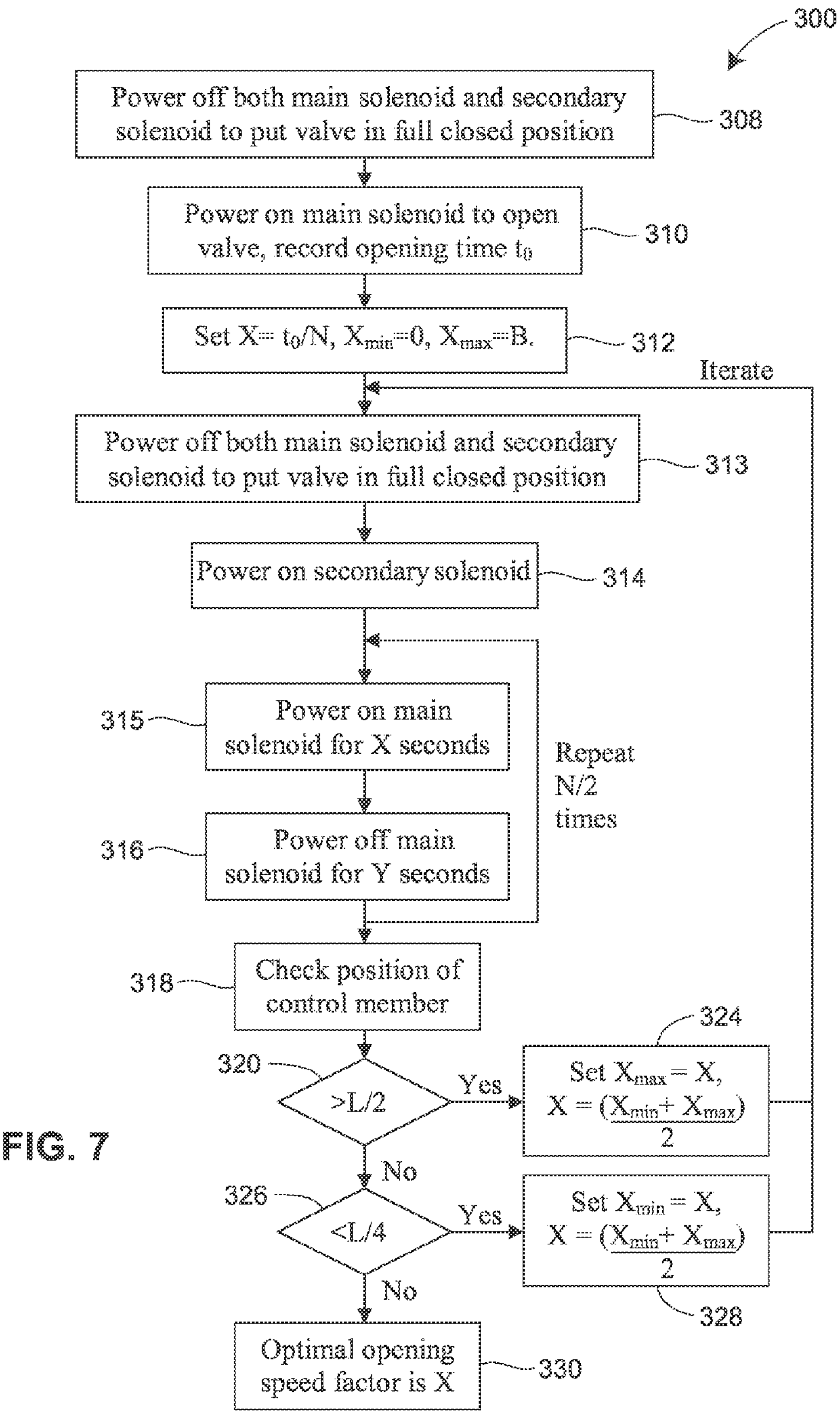
FIG. 7 is a logic diagram illustrating logic steps employed by a controller of the automatic speed searching device of FIG. 3 when performing a partial stroke test moving a control element from a closed position to an open position.

Turning now to FIG. 7, an example of partial stroke test logic 300 is illustrated for closed to open movement. Initially, certain parameters are set for the system. For example, a full stroke length (L), a target time for full movement (T), and a number of steps (N) are input. These initial values may be selected by a user in the case of the target time (T) and number of steps (N), or the initial values may be based on manufacturer's data, or actual measurements, for example in the case of full stroke length (L). Each stroke step (B) takes T/N seconds.

The processor 90 begins with the initial inputs discussed above. At step 308, both the main solenoid 70 and the secondary solenoid 82 are powered off to position the control element or valve plug 20 in a full closed position. The main solenoid 70 is powered on at step 310 to measure a time ($t_0$), where $t_0$ is defined as the time to stroke the control element or valve plug 20 from a full closed to a full open position at full or maximum speed. As discussed above, $t_0$ may be determined from manufacturer's data or an initial measurement that is performed after valve installation, $t_0$ does not need to be measured for every test. Once $t_0$ is measured (or input from manufacturers data), $t_0$ remains constant unless an operator determines that $t_0$ should be re-measured. At step 312, the processor 90 sets the stroke speed factor (X) to equal $t_0$/N, where the stroke speed has minimum ($X_{min}$=0) and maximum ($X_{max}$=B) values. At step 313, the main and secondary solenoids 70, 82 are powered off to move the control element or valve plug 20 to a full closed position in preparation for performing the partial stroke test. At step 314, the processor 90 instructs the main solenoid 70 to power on so that the fluid supply 56 is connected to the actuator 50. At step 315, the processor 90 instructs the main solenoid 70 to power on for X seconds and at step 316, the processor 90 instructs the main solenoid 70 to power off for Y=B−X seconds. In this way, control fluid flows into the actuator 50 in a step-wise manner. Thus, the control element or valve plug 20 also moves in a step-wise manner from a closed position towards an open position. Steps 315 and 316 are performed iteratively N/2 before proceeding to step 318. In other embodiments, steps 315 and 316 may be performed more or less than N/2 times. After performing steps 315 and 316 N/2 times, the position of the control member 20 is determined by the position signal from the position sensor 88 at step 318, and the position sensor 88 provides the position signal to the controller 90. A decision is made as step 320, where if the control element 20 has moved more than L/2, then the controller 90 sets $X_{max}$=X and X=($X_{min}$+$X_{max}$)/2 at step 224. Thereafter, steps 315 and 316 are again iteratively performed N/2 times before moving to step 318. If, however, at step 320, the control element 20 has not moved more than L/2, the processor 90 proceeds to step 326. At step 326, if the control element 20 has moved less than L/4, the processor 90 sets $X_{min}$=X and X=($X_{min}$+$X_{max}$)/2 at step 328. Thereafter, steps 315 and 316 are again iteratively performed N/2 times before moving to step 318. If, however, at step 326, the actuator stem has moved more than L/4, then by definition, the actuator movement is in the range of L/2 to L/4. This range is considered sufficient to define an optimal pulse speed or stroke speed factor, which is defined as X at step 330.

Accuracy of the speed control is determined by the number of steps and the solenoid valve response time. Accuracy may also be increased by adding algorithms, such as PID control, to the processor 90.

Figure 8:
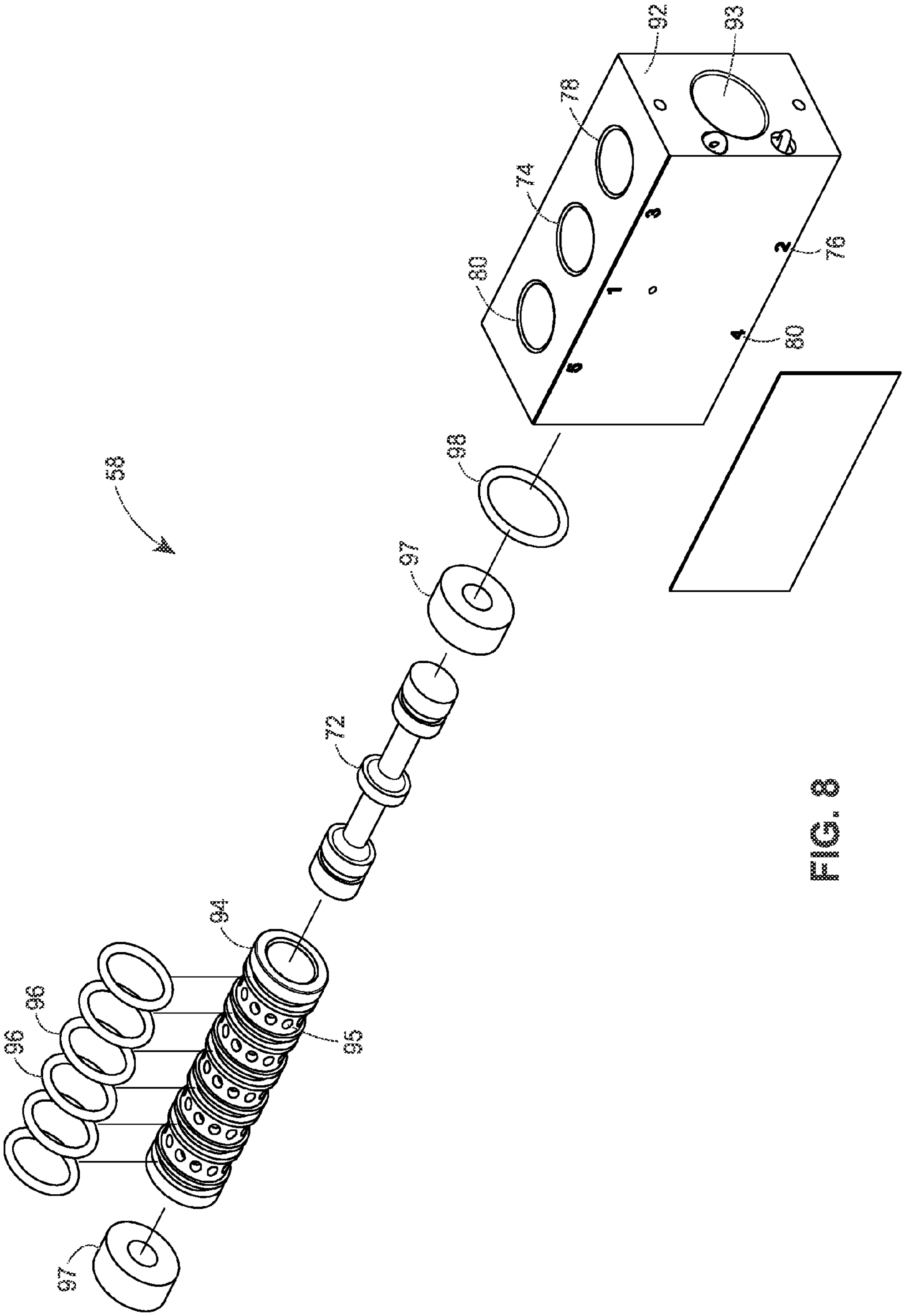
FIG. 8 is an exploded perspective view of one embodiment of a spool valve or a blocker valve of the automatic speed searching device of FIG. 1.

FIG. 8 illustrates one embodiment of the spool valve 58. A similar structure may be used for the blocker valve 60. The spool valve 58 includes a valve body 92 having a central bore 93 fluidly connected with the plugs 80, control fluid inlet port 74, the first control fluid outlet port 76, and the second control fluid outlet port 78. A perforated sleeve 94 is disposed within the central bore 93 and the slidable piston 72 is disposed within the perforated sleeve 94. The perforated sleeve 94 includes a plurality of openings 95 dispersed about a periphery of the perforated sleeve 94. The openings 95 allow control fluid to flow between the control fluid inlet and outlet ports 74, 76, and 78. The perforated sleeve 94 may include a plurality of seals, such as o-rings 96 that seal against an inner surface of the central bore 93. The o-rings 96 may divide the plurality of openings 95 into distinct groups and the o-rings 96 may prevent cross-flow between individual groups of openings 95 outside of the perforated sleeve 94. Spacers 97 and/or seals 98 may be disposed at either end of the perforated sleeve 94 to position and seal the perforated sleeve 94 within the central bore 93. The slidable piston 72 shifts within the perforated sleeve in response to inputs from the pilot valve 54 to fluidly connect two of the control fluid inlet port 74, the first control fluid outlet port 76, and the second control fluid outlet port 78 with one another to control fluid flow through the spool valve 58, as described above.

The disclosed automatic speed searching device advantageously determines an optimum stroke speed without the need for a positioner or a limit switch. By iteratively searching stroke speed with electrical pulses to control movement of the actuator stem in a step-wise manner, the disclosed automatic speed searching device rapidly determines an optimum stroke speed for a partial stroke test regardless of the actuator type or size.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. An automatic speed searching device for a partial stroke test of a control valve, the automatic speed device comprising:

a spool valve operatively connected to a pilot valve, the pilot valve being configured to position the spool valve to one of an open position and a closed position, the spool valve including a first control fluid inlet, a first control fluid outlet, and a second control fluid outlet, the first control fluid inlet being fluidly connected to a supply of control fluid and the first control fluid outlet being configured to be connected to a valve actuator;

a blocker valve fluidly connected to the second control fluid outlet of the spool valve; and an electrical module operatively connected to the pilot valve, the supply of control fluid, and the blocker valve, the electrical module generating pulse control signals, wherein the pilot valve and the blocker valve open or close in steps in response to the control signals, and the open position of the spool valve fluidly connects the first control fluid inlet to the first control fluid outlet and the closed position of the spool valve fluidly connects the first control fluid outlet to the second control fluid outlet.

2. The automatic speed searching device of claim 1, wherein the electrical module includes a main solenoid operatively connected to the pilot valve and a secondary solenoid operatively connected to the blocker valve.

3. The automatic speed searching device of claim 2, wherein the electrical module includes a first pressure sensor communicatively connected to the supply of control fluid.

4. The automatic speed searching device of claim 3, wherein the electrical module includes a second pressure sensor communicatively connected to a first chamber of the valve actuator.

5. The automatic speed searching device of claim 4, wherein the electrical module includes a position sensor input configured to receive a position signal from a position sensor connected to the valve actuator, the position sensor generating a position signal that indicates a current position of an actuator stem or valve stem.

6. The automatic speed searching device of claim 5, wherein the electrical module includes a processor, the processor reading signals from the first pressure sensor, the second pressure sensor, and the position sensor, the processor generating the control signals for the main and secondary solenoids.

7. The automatic speed searching device of claim 6, wherein the control signals are electrical pulses.

8. The automatic speed searching device of claim 1, wherein the spool valve includes a valve body, a central bore disposed in the valve body, a perforated sleeve disposed within the central bore, and a slidable piston disposed within the perforated sleeve.

9. The automatic speed searching device of claim 8, wherein the perforated sleeve includes a plurality of openings, the plurality of openings being separated into one or more groups by one or more seals disposed between the perforated sleeve and the valve body.

10. A control valve having an automatic speed searching device for a partial stroke test, the control valve comprising:

a valve body including a fluid inlet, a fluid outlet and a fluid passageway fluidly connecting the fluid inlet and the fluid outlet;

a valve plug disposed within the fluid passageway, the valve plug interacting with a valve seat to control fluid flow through the valve;

an actuator connected to the valve plug, the actuator moving the valve plug between an open position and a closed position in response to a control signal, the actuator including a first chamber and a second chamber separated by a diaphragm, the control signal including a fluid pressure signal directed to the first chamber through a control fluid input; and an automatic speed searching device connected to the actuator, the automatic speed searching device including, a spool valve operatively connected to a pilot valve, the pilot valve being configured to move the spool valve to one of an open position and a closed position, the spool valve including a first control fluid inlet, a first control fluid outlet, and a second control fluid outlet, the first control fluid inlet being fluidly connected to a supply of control fluid, and the first control fluid outlet being configured to be connected to a valve actuator;

a blocker valve fluidly connected to the second control fluid outlet of the spool valve; and an electrical module operatively connected to the pilot valve, the supply of control fluid, and the blocker valve, the electrical module including a processor and an iterative algorithm executable on the processor, wherein the processor executes the iterative algorithm to iteratively search for an optimum valve plug actuation speed for a valve signature test.

11. The control valve of claim 10, wherein the electrical module includes a main solenoid operatively connected to the pilot valve and a secondary solenoid operatively connected to the blocker valve.

12. The control valve of claim 11, wherein the electrical module includes a first pressure sensor communicatively connected to the supply of control fluid.

13. The control valve of claim 12, wherein the electrical module includes a pressure sensor input communicatively connected to a first chamber of the actuator.

14. The control valve of claim 13, wherein the electrical module includes a position sensor input configured to receive a position signal from a position sensor connected to the actuator, the position sensor generating a position signal that indicates a current position of an actuator stem or a valve stem.

15. The control valve of claim 14, wherein the processor reads signals from the pressure sensor, the pressure sensor input, and the position sensor input, and the processor generates control signals for the main and secondary solenoids, the control signals being electrical pulses that open or close the pilot and blocker valves in a step-wise manner in response to the control signals.

16. The control valve of claim 11, wherein the iterative algorithm instructs the processor to determine a time required ($t_0$) to fully stroke the valve plug of the control valve at maximum speed from the open position to the closed position.

17. The control valve of claim 16, wherein the iterative algorithm instructs the processor to determine a desired time (T) and a number of steps desired (N) in which to complete the partial stroke test.

18. The control valve of claim 17, wherein the iterative algorithm instructs the processor to set a stroke speed factor (X) equal to $t_0/N$.

19. The control valve of claim 18, wherein the iterative algorithm instructs the processor to set a minimum stroke speed factor ($X_{min}$) equal to zero and to set a maximum stroke speed factor ($X_{max}$) equal to a stroke step (B), where B equals T/N.

20. The control valve of claim 19, wherein the electrical module powers on both the main solenoid and the secondary solenoid to position a control element in a full open position, then the electrical module powers off the main solenoid, then the electrical module powers the secondary solenoid off for X seconds, then the electrical module powers the secondary solenoid on for Y seconds (where Y=B−X).

* * * * *

UNITED STATES PATENT AND TRADEMARK OFFICE

CERTIFICATE OF CORRECTION

PATENT NO. : 8,814,133 B2
APPLICATION NO. : 13/167449
DATED : August 26, 2014
INVENTOR(S) : Jingli Li et al.

It is certified that error appears in the above-identified patent and that said Letters Patent is hereby corrected as shown below:

<u>In the Specification:</u>

At Column 1, line 16, “though” should be -- through --.

Signed and Sealed this
Fifteenth Day of December, 2015

Michelle K. Lee
*Director of the United States Patent and Trademark Office*